United States Patent [19]
Calzavara et al.

[11] Patent Number: 4,741,615
[45] Date of Patent: May 3, 1988

[54] METHOD AND DEVICE FOR MEASURING COUPLING LOSSES IN SINGLE MODE OPTICAL FIBERS

[76] Inventors: Massimo Calzavara, C. so Peschiera, 142, int. 9; Gianni Coppa, Via Camerana, 4; Pietro Di Vita, C. so Francia, 357, all of Torino, Italy

[21] Appl. No.: 870,167

[22] Filed: Jun. 3, 1986

[30] Foreign Application Priority Data

Jul. 22, 1985 [IT] Italy ................. 67665 A/85

[51] Int. Cl.⁴ .......................................... G01N 21/84
[52] U.S. Cl. ................................................. 356/73.1
[58] Field of Search ....................................... 356/73.1

[56] References Cited

U.S. PATENT DOCUMENTS 4,523,843 6/1985 Melman et al. ............... 356/73.1 X

FOREIGN PATENT DOCUMENTS

| 0100921 | 2/1984 | European Pat. Off. |
| 42846 | 4/1978 | Japan. |
| 1049 | 1/1979 | Japan. |
| 17914 | 1/1982 | Japan. |
| 82740 | 5/1982 | Japan. |
| 28638 | of 1984 | Japan. |
| 107603 | 6/1985 | Japan. |
| 2159940 | 12/1985 | United Kingdom ......... 356/73.1 |

OTHER PUBLICATIONS

Electronics Letters, Jun. 25, 1981, vol. 17, No. 13, pp. 458-460.
Modern Geometrical Optics, by Max Herzberger, published Interscience Publishers, Inc., New York, 1958, pp. 21-22, 52.

Primary Examiner—Vincent P. McGraw
Attorney, Agent, or Firm—Karl F. Ross; Herbert Dubno; Ronald Lianides

[57] ABSTRACT

An optical beam is injected into a single-mode fiber of a given length and outgoes from an end face of the fiber, is reflected by a reflecting optical system into the fiber; the optical power of the reflected beam guided backward by the fiber is measured. The end face of the fiber is placed in the optical center of the reflecting system to obtain the maximum reflected power, and is then deviated from the position detecting the occurring reductions of the reflected optical power.

13 Claims, 3 Drawing Sheets

METHOD AND DEVICE FOR MEASURING COUPLING LOSSES IN SINGLE MODE OPTICAL FIBERS

CROSS REFERENCE TO COPENDING APPLICATIONS

This application is related to the following copending applications Ser. No. 779,082 (now U.S. Pat. No. 4,664,516) and Ser. No. 779,083 (now U.S. Pat. No. 4,662,744) filed Sept. 20, 1985, Ser. No. 779,788 filed Sept. 24, 1985, Ser. No. 740,968 (U.S. Pat. No. 4,657,388) filed June 4, 1985 and Ser. No. 669,606 filed Nov. 8, 1984.

FIELD OF THE INVENTION

Our present invention relates to a system for measuring the characterizing parameters of optical fibers and, more particularly, to a method and device for measuring coupling losses in single-mode optical fibers.

BACKGROUND OF THE INVENTION

Coupling losses usually occur at junctions between optical fiber trunks and are chiefly due to transverse and/or longitudinal offsets between the two trunks.

A method known in the art of measuring coupling losses is described in the paper entitled: "Direct method of determining equivalent-step-index profiles for monomode fibers", C. A. Millar, Electronics Letters, 25th June 1981, Vol. 17, No. 13.

According to this method, two lengths of the same single-mode optical fiber are placed facing each other with the axes aligned, and an optical beam is injected into them.

A transverse offset is then introduced between the two fibers which allows the measurement of the optical power transferred from one fiber to the other, and consequently of the amount of the coupling losses.

The method allows the measurement of the Mode Field Diameter MFD which is a parameter indicative of micro-bending and coupling losses in single-mode optical fibers.

Mode Field Diameter is given by twice the transverse offset value for which the measured optical power drops to 1/e times the maximum value.

According to this method a longitudinal offset between the two fibers can be also introduced; thus also coupling losses between two fiber trunks, due to their longitudinal separation, can be measured.

The two fibers are held facing each other by means of a high precision calibrated mechanical device or mechanism comprising micromanipulators for the micrometric regulation of fiber alignment and allowing transverse and/or longitudinal offsets of desired and measurable amounts to be set.

For the maximum optical power transfer, the end faces of the two fibers should be kept in contact; this, however, would no longer allow the transverse offset regulation because of rubbing between the two end faces, which hence are kept at a distance as little as possible from each other; this distance is however, conspicuous (about 5 $\mu$m).

The two fibers are simply obtained by cutting the same fiber length at a certain point; to obtain the maximum optical power transfer the two end faces ought to be planar, non-corrugated and perpendicular to the fiber axis.

However, such a cut is rather difficult to obtain; actually the two end faces are slightly oblique (with angles even wider than 1° with respect to perpendicularity to the axis), corrugated and irregular, with convexities, swells and hackles.

The presence of hackles requires an increase in the distance between the two end faces to prevent their rubbing. Hence additional optical power losses are introduced due both to the unwanted longitudinal offset between the two trunks, and to the non-perpendicularity and irregularity of the end faces.

This effect alters the measurement reducing its accuracy.

Besides, by this method, a significant MFD measurement cannot be obtained when the fiber core section has a two-fold symmetrical shape (i.e. elliptical shape) instead of circular shape.

In fact the two fibers, as a consequence of the cut, usually undergo a reciprocal rotation difficult to be compensated for, which causes in this case a mismatch of the two sections and an uncertainty in the measurement of MFD value due to additional optical power losses which vary with the mutual rotation amount and with the direction and sense of the transverse offset.

OBJECT OF THE INVENTION

It is the object of the invention to eliminate these drawbacks by providing an improved method of and device for measuring optical coupling losses characteristic of single-mode optical fibers.

SUMMARY OF THE INVENTION

This object is attained in accordance with the present invention in a method of measuring coupling losses between single-mode fibers which instead of providing the optical power transfer from one fiber length to another facing the first, provides the optical beam reflection in the same fiber length emitting it, by means of a reflecting optical system which in one embodiment is a spherical mirror, in another embodiment is a system of collimating lenses followed by a planar mirror, and in a further embodiment is a system of magnifying lenses followed by a spherical mirror.

In this way the disadvantage of the optical power losses due to the end face imperfections is overcome, since the optical beam is anyway reflected by the reflecting optical system into the same fiber wherefrom it is emitted, even if the end face is not perfectly perpendicular to the fiber axis, hence independently of the emission angle of the optical beam with respect to the axis.

The difficulty of regulating the distance between the end faces of the two fibers, which can arise due to their imperfect planarity, is also solved since now the longitudinal positioning of the end face is no longer hindered by the presence of the second fiber.

In the case in which the fiber core section has a two-fold-symmetry, the problem of the mutual rotation of the two end faces is resolved, since the image of the section reflected by the reflecting optical systems is always oriented with the symmetry axes parallel to those of the fiber core section.

In transverse offset conditions, the reflected core image moves without rotating with respect to the emitting core, introducing no measurement errors.

The system of the present invention also allows the measurement of coupling losses due to the longitudinal offset between two fiber trunks of a joint by simply introducing longitudinal offsets between the fiber and the reflecting optical system.

The method of measuring optical coupling losses between single-mode optical fibers, according to the invention, thus comprises the steps of:

injecting a light beam into one end of a length of a single-mode optical fiber, the beam being transmitted through a core of the length of the single-mode optical fiber and emerging from an opposite end thereof;

centering the opposite end of the core at an optical center of a reflecting system in a reference state of the single-mode optical fiber, and reflecting with the reflecting system an emerging light beam back through the opposite end and through the single-mode optical fiber in a reflected beam which emerges at the one end;

measuring the optical power of the reflected beam as a reference power;

offsetting the opposite end of the core from the optical center of the reflecting system and reflecting with the reflecting system another emerging light beam back through the opposite end and through the single-mode optical fiber in another reflected beam which emerges at the one end; and measuring the optical power of the other reflected beam and comparing the measurement thereof with the reflected power to determine an optical coupling loss constituting a characterizing parameter of the single-mode optical fiber as a function of the offset.

The device according to the invention for measuring optical coupling losses between single-mode optical fibers, can comprise:

means for injecting a light beam into one end of a length of a single-mode optical fiber, the beam being transmitted through a core of the length of the single-mode optical fiber and emerging from an opposite end thereof;

means forming a reflecting system having an optical center at the opposite end of the single-mode optical fiber;

means for centering the opposite end of the core at the optical center of the reflecting system in a reference state of the single-mode optical fiber whereby the reflecting system reflects an emerging light beam back through the opposite end and through the single-mode optical fiber in a reflected beam which emerges at the one end;

means for measuring the optical power of the reflected beam to form a reference power when the single-mode optical fiber is in the reference state; and means for offsetting the opposite end of the core from the optical center of the reflecting system whereby the reflecting system can reflect another emerging light beam back through the opposite end and through the single-mode optical fiber in another reflected beam which emerges at the one end so that the means for measuring measures the optical power of the other reflected beam and compares the measurement thereof with the reflected power to determine an optical coupling loss constituting a characterizing parameter of the single-mode optical fiber as a function of the offset.

More specifically the device for measuring optical coupling losses between single-mode optical fiber comprises:

a primary source of optical signals for injecting a primary light beam into one end of a length of a single-mode optical fiber, the primary beam being transmitted through a core of the length of the single-mode optical fiber and emerging from an opposite end thereof;

a reflecting optical system at the opposite end having an optical center at which an end face of the core at the opposite end is disposed;

a mechanical mechanism between the reflecting optical system and a portion of the single-mode optical fiber comprising the end face for relative micrometric adjustment of a position of the end face with respect to the reflecting optical system so that the emerging primary beam is reflected by the reflecting optical system and at least partly reenters the single-mode optical fiber through the end face, whereby a reflected beam emerges at the one end;

a first beam splitter between the primary source and the single-mode optical fiber inclined to the primary beam and deviating the reflected beam; and detecting and measuring means in a path of the reflected beam deviated by the first beam splitter for measuring and comparing optical power detected when the end face of the core and its reflected beam image coincide at the optical center with optical power detected when end face and its reflected beam image are mutually offset because of adjustment of the mechanical mechanism to determine an optical coupling loss constituting a characterizing parameter of the single-mode optical fiber as a function of the offset.

The reflecting optical system can consist of a first spherical mirror so that the optical center corresponds to the curvature center of the spherical mirror.

Furthermore the reflecting optical system can consist of a first magnifying lens array and a second spherical mirror, positioned so that when the end face of the fiber is in the intersection of the working plane with the axis of the first lens array, the latter forms a real magnified image of the end face at the curvature center of the second spherical mirror, the intersection between the working plane and the axis being the optical center.

The reflecting optical system can have a second collimating lens array and a first planar mirror perpendicular to the primary optical beam coming from the end face and collimated by the second lens array, the first plane mirror reflecting the optical beam towards the end face through the second lens array, the optical center corresponding to the focus of the second lens array.

The micrometric adjustment means can produce transverse offsets of the second spherical mirror with respect to the axis of the first lens array to generate the transverse offsets between the end face and its image.

Alternatively the micrometric adjustment means can produce a tilt of the first planar mirror with respect to the perpendicular position, to generate the transverse offsets between the end face and its image.

For the positioning of the end face of the fiber in the optical center of the reflecting optical system a secondary optical beam which is visible can be used, which replaces the primary beam, and the device can further comprise a second beam splitter inserted in the mechanism in the trajectory or path of the secondary optical beam with such a tilt or inclination that it forms an image of the end face in a first visualizing optical array; this is also received in the mechanical device, the positioning of the end face of the fiber at the optical center being carried out by the adjustment means until there can be seen in the first visualizing optical array the focused image of the end face of the fiber and the image of the core of the fiber reflected by the reflecting optical system coincident with the direct one.

The first spherical mirror can be of the totally-reflecting type and the first visualizing optical array can consist of an optical microscope, the second beam splitter being placed between the end face and the first spherical mirror.

The second spherical mirror can be of the totally-reflecting type, the first visualizing optical array can consist of an optical microscope, and the second beam splitter can be placed between the first lens array and the curvature center of the second spherical mirror.

The first visualizing optical array can comprise a telescope and the second splitter can be placed between the second lens array and the first planar mirror.

For positioning of the end face of the fiber at the optical center of the reflecting optical system, a secondary optical beam which is visible is used, replacing the primary optical beam and the first or second spherical mirror can be of the partly-reflecting type; furthermore a second visualizing optical array can also be provided in the mechanical device and facing the convex portion of the spherical mirror. The positioning of the end face of the fiber in the optical center is carried by the micrometric adjustment means until there can be seen in the second visualizing optical array the focused image of the end face of the fiber coincident with its image refracted by the reflecting optical system.

A secondary source of an optical signal which is visible can emit the secondary optical beam while a second planar mirror is located in the path of the primary optical beam before the first beam splitter, which reflects the secondary optical beam towards the optical fiber in replacement of the primary optical beam it interrupts.

In the invention the relative controlled offset is introduced between the fiber end face and its image reflected by the reflecting optical system, in the transversal direction, serves as a measure of the MFD parameter, or in the longitudinal direction, as a measure of separation-dependent losses.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
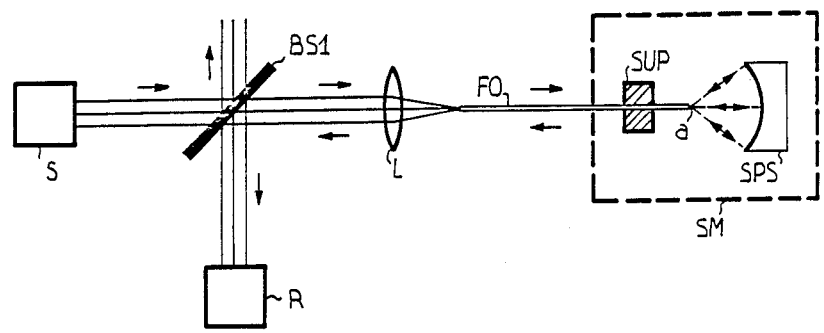
FIG. 1 is a diagram of the device according to the invention.

FIG. 1 shows a single-mode optical fiber FO of a given length and a common basically monochromatic electromagnetic radiation source S, also referred to as a light source, which can possibly comprise lenses for collimating the optical beam. A lens array, denoted by L, allows the beam to be focused on fiber FO. The technique used to convey the optical beam into the fiber is usally known and needs no further explanations.

R denotes a conventional optical detector associated with a system for measuring the detected optical power.

BS1 denotes a common beam splitter inserted along the optical beam path from source S to fiber FO with a determined tilt with respect to the beam.

A portion of the optical beam emitted by S crosses BS1 and arrives at FO, while another portion is reflected by BS1 upwards in the direction indicated by the arrow and is lost.

Another portion of the optical beam from light source S is reflected by BS1 towards detector R to be measured.

SPS indicates a spherical mirror which is the first embodiment of the reflecting optical system mentioned while describing the method.

The concavity of mirror SPS faces the end face of fiber FO denoted by a: the latter is held, through support SUP, in such a position that the core section of end face a is placed in the curvature center of spherical mirror SPS.

The optical center of the reflecting system is in this case the curvature center of SPS.

Dotted line SM indicates the presence of a known type mechanical device containing spherical mirror SPS and support SUP with the end portion of fiber FO comprising face a. Mechanical device or mechanism SM provides the micrometric adjustment of the relative positioning of mirror SPS and of end face a, through for instance high-precision calibrated micromanipulators, by which end face a can be positioned at the SPS center, and afterwards a transverse or longitudinal offset of a predetermined measurable value of end face a with respect to the centering position can be introduced.

When the fiber core section of end face a is positioned at the exact curvature center of spherical mirror SPS, the optical beam outgoing from a, which arrives from source S through L, is reflected by mirror SPS towards the same face a, enters fiber FO, is collimated by L and reflected by beam splitter BS1 towards detector R which will measure the maximum reflected optical power value.

This condition is obtained regardless of the actual emission angle of the optical beam with respect to the fiber axis, since for any emission angle comprised in the mirror aperture, the optical beam will always be reflected on itself owing to the presence of the spherical mirror.

Thus the optical power loss found in the known system due to non-orthogonality of face a with respect to the fiber axis is compensated for.

Besides, since the second fiber length is no longer needed, the inconvenience due to the difficulty of regulating the gap between the two end faces is eliminated.

Upon introducing a transverse offset, detector R reveals an optical power reduction, since a more or less considerable portion of optical power is reflectd by mirror SPS outside the fiber core section of face a, depending on the value of transverse offset, upon which in turn the Mode Field Diameter MFD measurement depends.

Under offset conditions the image of the core of face a reflected by the spherical mirror moves without rotating with respect to the real core. In this way if the core is not circular, but it has a two-folded symmetry shape, namely an elliptical shape, a significant MFD measurement is obtained, because additional power losses, due to the mutual rotation of the two end-faces found in the known MFD measurment systems, are eliminated.

Spurious Fresnel reflections occurring at both end faces of the fiber and at lens array L must also be taken into account: such reflections give rise to a constant optical power value, which can be detected by the measuring instrument in the absence of coupling which is to be subtracted from the values measured in the presence of coupling.

Figure 2:
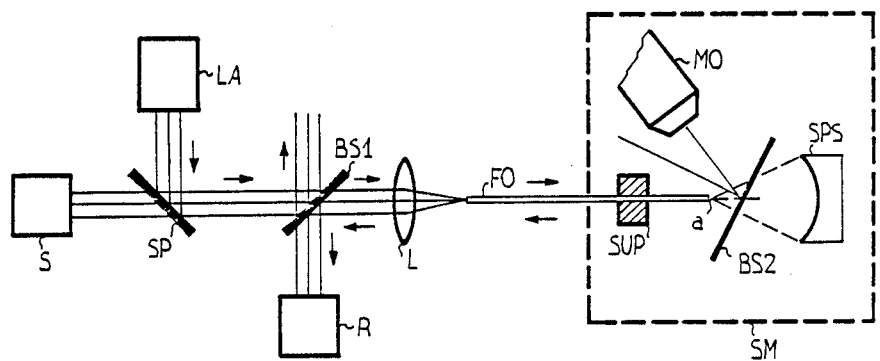
FIG. 2 shows the device of FIG. 1 comprising auxiliary elements for the preliminary focusing operations.

FIG. 2 shows a modification of the device of FIG. 1 to facilitate the initial operation of positioning of face a in the curvature center of mirror SPS.

In FIG. 2, MO denotes a conventional optical microscope which is inserted into the mechanical device SM in a lateral position with respect to the direction of the optical beam which outgoes from the fiber and reaches the mirror.

BS2 denotes a beam splitter inserted in the trajectory of the optical beam outgoing from face a of the fiber with a tilt such as to form with microscope MO an image of face a itself.

For the initial positioning operation, an optical source is used in the visible range e.g. an He-Ne laser denoted by LA which, through a mirror SP, placed between the primary source S and the beam splitter BS1, and lens array L, injects light into fiber FO. Besides mirror SP interrupts the optical beam emitted by the primary source S which can also remain switched on.

After the initial operation of position regulation of face a, it will be sufficient to remove mirror SP and beam splitter BS2.

The positioning in the center of SPS of the core section of face a is obtained when by microscope MO there can be seen:

the image of face a focused (condition attained by the adjustment in longitudinal direction of the distance between face a and mirror SPS);

the image of the fiber core reflected by SPS coincident with the direct one (condition attained with relative transversal displacements between face a and mirror SPS).

It is worth noting that once the initial fiber positioning phase is finished, microscope MO can remain inserted in SM since it does not interfere with the optical-beam direct-path between the fiber and the spherical mirror, while it is sufficient to remove beam splitter BS2; hence from the structural point of view mechanical device SM can provide the fixed position of microscope MO and the housing place of BS2 which can be inserted and removed at will.

What has been described has been given only by way of non-limiting example. Variations and modifications are possible without going out of the scope of the present invention.

Figure 3:
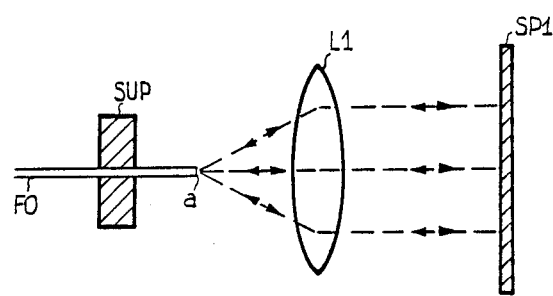
FIG. 3 is an alternative embodiment of the device according to the invention.

FIG. 3, for instance, shows an alternative embodiment of the reflecting optical system provided by the method.

The optical system of FIG. 3 consists of a collimating lens array denoted by L1, for example consisting of a reflected-light microscope objective, and of a plane mirror SP1. If the optical beam source is in the focus of L1, the beam rays outgoing therefrom are parallel.

The optical center of the lens array corresponds in this example to the focus of lens array L1.

By plane mirror SP1, placed perpendicular to the rays outgoing from L1, the optical beam is reflected towards L1 itself, whereby it is converged onto face a of the fiber. Hence system L1, SP1 is equivalent to spherical mirror SPS of FIG. 1.

Figure 4:
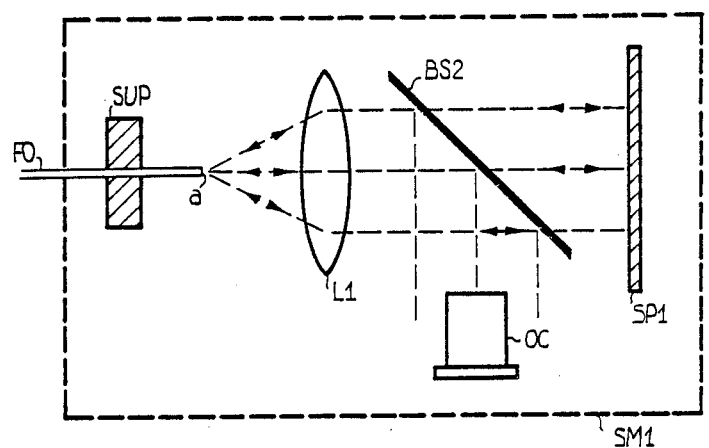
FIG. 4 shows the device of FIG. 3 comprising additional elements for the preliminary focusing operations.

FIG. 4 shows a non-limiting example of how the device of FIG. 3 can be modified to facilitate the initial positioning operation of face a in the focus of the lens array L1.

The distance between L1 and SP1 (FIG. 4) is not critical and can be adjusted to allow the insertion of beam splitter BS2 along the optical beam path; BS2 is inserted with a tilt, with respect to the optical beam, such as to partly reflect the latter towards a usual telescope OC placed laterally. The OC function is the same as that of microscope MO of FIG. 2, i.e. that of allowing the positioning of the core section of face a in the focus of system array L1, according to what has already been described in relation to FIG. 2, with relative displacements between face a of the fiber and lens array L1.

Also for the example of the embodiment described in FIGS. 3 and 4 there are provided, but not shown for the sake of simplicity, generators S, LA, detector R, mirrors SP, BS1, lens array L, as in the example of FIGS. 1 and 2.

Mechanical device SM1, of the type similar to SM of FIG. 2, contains fiber FO and its support SUP, lens array L1, mirror SP1, telescope OC and the housing place of beam splitter BS2, which will be inserted only in the initial positioning phase of face a in the focus of L1.

Figure 5:
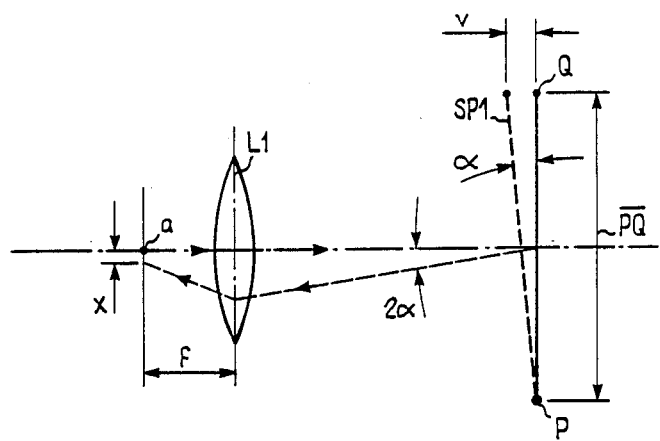
FIG. 5 shows a way of acting on the system of FIG. 3 to obtain MFD measurement.

To measure the mode Field Diameter (MFD) by the system shown in FIGS. 3 and 4, either a transverse offset can be introduced between fiber end face a and reflecting optical system L1-SP1, or planar mirror SP1 can be slightly tilted with respect to the perpendicularity to the optical beam axis, as shown in FIG. 5.

Mirror SP1 is hinged at end P; the other end Q is coupled to a micromanipulator, it too being inserted in mechanical system SM1 (not shown in the Figure) which regulates end Q movement.

The focal distance of lens L1 at which fiber end face a is placed, is shown at f, and to obtain an offset x, mirror SP1 is tilted by an angle $\alpha$ with respect to the perpendicularity condition, so that the reflected optical beam has an angle $2\alpha$ with respect to the fiber axis.

Reference character v denotes the longitudinal offset the micromanipulator is to apply to end Q of SP1 to obtain angle $\alpha$; segment $\overline{PQ}$ practically corresponds to the length of the support of mirror SP1 from hinge point P to point Q, whereto the micromanipulator is coupled.

By geometrical optical formulae it can be shown that for small $\alpha$:

$$x/f = 2\alpha = 2v/PQ \rightarrow v{:}x = PQ{:}2f$$

A ratio $v/x \approx 10$ can be obtained from typical values of $\overline{PQ} \approx 10$ cm, $f \approx 0.5$ cm.

Hence an amplification of the movement to be introduced by the micromanipulator is obtained, with respect to the case described in connection with FIG. 3, under the same transverse offset conditions.

That makes it easier to regulate the movement and to know with higher accuracy the value of the offset introduced.

A partly-reflecting spherical mirror can be used as a reflecting optical system in replacement of the totally-reflecting mirror used in the example of the embodiment shown in FIGS. 1, 2. In this way fiber end face a can be observed through the partly reflecting surface, since a portion of the optical beam traverses the mirror. The partly-reflecting spherical mirror used is known in the technique as "Luboshez lens", i.e. a positive aplanatic meniscus lens, described e.g. in the book entitled "*Modern Geometrical Optics*", by M. Herzberger, issued by Interscience Publishers, Inc., New York, 1958, pages 21, 22, 52; the two mirror surfaces consist of a spherical concave surface and a convex one with a smaller curvature radius.

For an object placed at the curvature center of the concave spherical surface a correct virtual image is obtained, i.e. with no aberration, but the chromatic one, which, however, in our case does not matter, as monochromatic optical beams are dealt with. The virtual image is magnified $n^2$ times the real image, where n is the refractive index of the material the spherical mirror is made of.

The concave surface of the spherical mirror is metallized to increase its reflectivity.

The spherical mirror positioning in a MFD measurement system is analogous to that of the example of the embodiment shown in FIG. 1.

The fact that a portion of the optical beam emitted by face a is not reflected and traverses the mirror, does not affect the MFD measurement, since an optical power ratio is to be measured.

By the use of this spherical mirror type the initial operation of positioning face a in the center of the mirror is made easier.

In fact in this case face a is observed by means of a known lens array placed facing the convex part of the spherical mirror: beam splitter BS2 (FIG. 2) and microscope MO, whose insertion into mechanical device SM is critical owing to the small space available, can thus be eliminated.

In this way, the spherical mirror can have a wider numerical aperture thus obtaining a better definition of the reflected image, and can form the first lens of the lens array permitting the observation of face a of the fiber.

Figure 6:
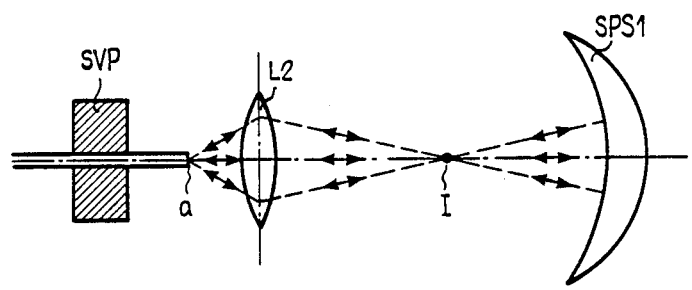
FIG. 6 shows another alternative embodiment of the device according to the invention.

A further example of the embodiment of the reflecting optical system is shown in FIG. 6. The optical system comprises a magnifying lens array L2, consisting of a direct-light microscope objective, and a spherical mirror SPS1 which can be either of the totally or of the partly-reflecting type, previously described.

The distance between L2 and SPS1 is such that if face a of the fiber is placed at the intersecting point of the working plane with the axis of lens array L2, the latter forms a real magnified image I of face a in the center of the spherical mirror. The magnifying ratio of L2 and the curvature radius of SPS1 must be such that the hypothesis of punctiform image I at the center of mirror SPS1 may still remain valid.

It is worth noting that the presence of lens array L2 allows the use of a spherical mirror SPS1 of reduced numerical aperture.

The system of FIG. 6 is similar to that shown in FIG. 1, but it makes the offset for MFD measurement easier to control. Holding in fixed position the fiber and lens array L2, spherical mirror SPS1 is transversely displaced; with respect to the transverse offset which ought to be introduced between fiber FO and spherical mirror SPS1 in the system of FIG. 1, the transverse offset to be given to SPS1 is amplified by a number of times equal to the magnifying ratio of L2 under the same conditions of desired offset between face a and its image reflected by the optical system.

Thus the micromanipulator which regulates the transverse offset of mirror SPS1 is easier to control.

The micromanipulator is inserted in the mechanical device (of known type and not shown in the Figure for the sake of simplicity), which comprises support SUP, lens array L2 and mirror SPS1; it is worth noting that the distance of the fiber axis between L2 and SPS1 is fixed and the only possible movement for SPS1 is transverse.

As to the initial operation of positioning face a in the working plane of lens L2 (equivalent to that of positioning face a in the center of mirror SPS in the system of FIG. 2), in the case of a totally-reflecting spherical mirror SPS1, a technique is used similar to that shown in FIG. 2, positioning beam splitter BS2 between lens L2 and the center of spherical mirror SPS1; in the case of a partly-reflecting spherical mirror SPS1, the technique already described in relation to the alternative embodiment of the reflecting optical system consisting of the partly-reflecting spherical mirror only, is used.

We claim:

1. A method of measuring optical coupling losses between single-mode optical fibers, comprising the steps of:
   injecting a light beam into one end of a length of a single-mode optical fiber, said beam being transmitted through a core of said length of said single-mode optical fiber and emerging from an opposite end thereof;
   centering said opposite end of said core at an optical center of a reflecting system in a reference state of said single-mode optical fiber, and reflecting with said reflecting system an emerging light beam back through said opposite end and through said single-mode optical fiber in a reflected beam which emerges at said one end;
   measuring the optical power of said reflected beam as a reference power;
   offsetting said opposite end of said core from said optical center of said reflecting system and reflecting with said reflecting system another emerging light beam back through said opposite end and through said single-mode optical fiber in another reflected beam which emerges at said one end; and
   measuring the optical power of said other reflected beam and comparing the measurement thereof with said reference power to determine an optical coupling loss constituting a characterizing parameter of said single-mode optical fiber as a function of the offset.

2. A device for measuring optical coupling losses between single-mode optical fibers, comprising:
   a primary source of optical signals for injecting a primary light beam into one end of a length of a single-mode optical fiber, said primary beam being transmitted through a core of said length of said single-mode optical fiber and emerging from an opposite end thereof;
   a reflecting optical system at said opposite end having an optical center at which an end face of said core at said opposite end is disposed;
   a mechanical mechanism between said reflecting optical system and a portion of said single-mode optical fiber comprising said end face for relative micrometric adjustment of a position of said end face with respect to said reflecting optical system so that the emerging primary beam is reflected by said reflecting optical system and at least partly reenters said single-mode optical fiber through said end face, whereby a reflected beam emerges at said one end;

a first beam splitter between said primary source and said single-mode optical fiber inclined to said primary beam and deviating said reflected beam; and detecting and measuring means in a path of the reflected beam deviated by said first beam splitter for measuring and comparing optical power detected when said end face of said core and its reflected beam image coincide at said optical center with optical power detected when end face and its reflected beam image are mutually offset because of adjustment of said mechanical mechanism to determine an optical coupling loss constituting a characterizing parameter of said single-mode optical fiber as a function of the offset.

3. The device defined in claim 2 wherein said reflecting optical system consists of a spherical mirror (SPS) and said optical center corresponds to the curvature center of said spherical mirror.

4. The device defined in claim 2 wherein said reflecting optical system consists of a magnifying lens array (L2) and a spherical mirror (SPS1), positioned such that, when said end face of the fiber (a) is in the intersection of the working plane with the axis of the lens array (L2), the latter forms a real magnified image (I) of the end face in the curvature center of said spherical mirror (SPS1), said intersection between the working plane and the axis being said optical center.

5. The device defined in claim 2 wherein said reflecting optical system consists of a collimating lens array (L1) and a planar mirror (SP1) placed perpendicular to the primary optical beam, coming from said end face (a) and collimated by said lens array (L1), said planar mirror reflecting said optical beam towards said end face through said lens array, said optical center corresponding to the focus of said lens array (L1).

6. The device defined in claim 2 wherein micrometric adjustment means is provided in said mechanism (SM) to produce transverse offsets of a spherical mirror (SPS1) with respect to the axis of a lens array (L2), to generate said transverse offsets between the end face (a) and its image.

7. The device defined in claim 2 wherein said mechanism produces a tilt of a planar mirror (SP1) with respect to a perpendicular position, to generate said transverse offsets between the end face (a) and its image.

8. The device defined in claim 4 wherein for the positioning of said end face (a) of the fiber in the optical center of said reflecting optical system (SPS; L1, SP1) a secondary optical beam in the visible portion of the spectrum is used, which replaces the primary beam, and device further comprises a second beam splitter (BS2) inserted in said mechanical device (SM) in the trajectory of said secondary optical beam with such a tilt that it forms an image of said end face in a first visualizing optical array (MO, OC) in said mechanical device (SM), positioning of the end face (a) of the fiber in the optical center being carried out by acting on said micrometric adjustment means until there can be seen in said first visualizing optical array (MO, OC) the focused image of the end face (a) of the fiber and the image of the core of the fiber reflected by the reflecting optical system coincident with the real image.

9. The device defined in claim 8 wherein said spherical mirror (SPS) is of the totally-reflecting type and said first visualizing optical array consists of an optical microscope (MO), and said second beam splitter (BS2) is placed between said end face (a) and said spherical mirror (SPS).

10. The device defined in claim 4 wherein said spherical mirror (SPS1) is of the totally-reflecting type, and in that a visualizing optical array is provided which consists of an optical microscope (MO), and a second beam splitter (BS2) is placed between said lens array (L2) and the curvature center of said spherical mirror (SPS1).

11. The device defined in claim 5 wherein a visualizing optical array consisting of a telescope (OC) and a second beam splitter (BS2) is placed between said lens array (L1) and said plane mirror (SP1).

12. The device defined in claim 3 wherein for the positioning of said end face (a) of the fiber in the optical center of said reflecting optical system (SPS; L2, SPS1), a secondary optical beam in the visible range of the spectrum is used replacing the primary optical beam, and in that said spherical mirror (SPS; SPS1) is of the partly-reflecting type, and a visualizing optical array is provided in said mechanical device (SM) and faces a convex portion of the spherical mirror, said positioning of the end face (a) of the fiber in the optical center being carried out by acting on said micrometric adjustment means until there can be seen in said visualizing optical array the focused image of the end face (a) of the fiber coincident with its image reflected by the reflecting optical system.

13. The device defined in claim 9 which further comprises:

a secondary source (LA) of an optical signal of the visible portion of the spectrum emitting said secondary optical beam; and another planar mirror (SP) is placed in the path of said primary optical beam before said first beam splitter (BS1), which reflects said secondary optical beam towards said optical fiber (FO) in replacement for the primary optical beam it interrupts.

* * * * *